United States Patent [19]

Feltzin et al.

[11] 4,242,415

[45] Dec. 30, 1980

[54] IN-MOLD COATING COMPOSITIONS CONTAINING FUNCTIONAL GROUP TERMINATED LIQUID POLYMERS

[75] Inventors: Joseph Feltzin; Thomas J. Galvin; Erich Kuehn, all of Wilmington, Del.

[73] Assignee: ICI Americas Inc., Wilmington, Del.

[21] Appl. No.: 972,912

[22] Filed: Dec. 26, 1978

Related U.S. Application Data

[63] Continuation-in-part of Ser. No. 913,825, Jun. 8, 1978, abandoned.

[51] Int. Cl.$^3$ .............................................. C08L 75/00
[52] U.S. Cl. ................................... 428/412; 428/414; 428/480; 525/440; 525/455; 525/529; 525/530; 525/910; 525/911; 525/920; 525/922; 525/126; 428/423.3; 428/423.7
[58] Field of Search ............... 525/920, 910, 911, 440, 525/455, 529, 550, 922; 260/859; 428/412, 414, 423, 480

[56] References Cited

U.S. PATENT DOCUMENTS

| | | | |
|---|---|---|---|
| 3,641,199 | 2/1972 | Niederhauser | 260/859 R |
| 3,677,920 | 7/1972 | Kai | 260/859 R |
| 3,876,726 | 4/1975 | Ford | 260/859 R |
| 3,892,819 | 7/1975 | Najvar | 525/911 |
| 3,907,751 | 9/1975 | Knight | 260/859 R |
| 4,020,125 | 4/1977 | Suzuki | 525/920 |
| 4,058,657 | 11/1977 | Ireland | 260/859 R |
| 4,073,828 | 2/1978 | Ferarini | 260/859 R |
| 4,107,116 | 8/1978 | Riew | 204/159.19 |
| 4,111,770 | 9/1978 | Najvar | 204/159.19 |
| 4,129,670 | 12/1978 | Riew | 260/37 EP |

*Primary Examiner*—Paul Lieberman

[57] ABSTRACT

Fully cured reinforced molded resins such as polyesters, polyurea urethanes, polyureas, polyurethanes, polyisocyanurates, polyepoxies and polycarbonate resins can be in-mold coated to cover surface defects such as sink marks and microcracks with an improved coating composition comprising reactive liquid polymers, a vinyl monomer, and certain cross-linkable unsaturated ester resins as co-polymers.

12 Claims, No Drawings

IN-MOLD COATING COMPOSITIONS CONTAINING FUNCTIONAL GROUP TERMINATED LIQUID POLYMERS

BACKGROUND OF THE INVENTION

This is a continuation-in-part of U.S. Ser. No. 913,825 filed June 8, 1978 now abandoned.

This invention relates to molded thermosetting plastic articles and especially fiber reinforced plastic articles and more particularly to coating compositions and methods for applying them to cover surface defects such as sink marks, porous areas, microcracks and open knit lines. The invention is more particularly directed to stable liquid coating compositions having extended shelf life which can be used as a single system for coating cured compositions are particularly useful when applied to molded substrates that have improved adherence and can be substituted for a sanding and primer coating operation normally required for such uncoated articles prior to painting.

In mold coating compositions and methods of application are well-known and in particular are described in British Pat. No. 1,457,935. Such processes require injecting a resin compound mixed with reinforcing fibers, usually glass fibers, in the form of either a sheet molding compound or a bulk molding compound into a shaped mold, compressing the mold to form the desired part applying heat to cure the resin, opening the mold slightly, injecting a coating composition to fill the space between the substrate and the open mold face, closing the mold slightly to squeeze the coating uniformly over the surface to a thickness of less than 20 mils usually from 0.5–5 mils and curing the coating. In the present state of the art, the coating compositions are derived from a two component system which when mixed begin to polymerize and normally gel within a few hours or days at which point they become useless as an in-mold coating composition. Furthermore, such two components require exact metering and measuring at the point of their use in order to derive a satisfactory coating having uniform properties and curing times.

The coating compositions presented hereinafter provide the sheet molder with a single mix composition which has stability for six or more months when stored under normal conditions and require no accurate mixing of ingredients prior to use as an in-mold coating.

It is an object, therefore, to provide a method of forming a compression or injection molded, fully cured, reinforced thermoset article with a compression or injection molded coating having a smooth surface, superior adherence and adequate hardness.

It is another object of the invention to provide a compression or injection molded completely cured reinforced thermoset article having a compression or injection molded coating.

It is another object of the invention to provide a molding composition useful in providing a superior compression or injection molded coating having superior adherence smoothness and durability when applied to a compression or injection molded completely cured reinforced thermoset article.

These and other objects of the invention are accomplished by co-polymerizing an unsaturated polyester or polyurethane resin with a vinyl monomer in solutions containing functional group terminated liquid polymers having the general formula:

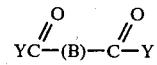

wherein Y is —OH, an aliphatic hydroxy group containing radical of 2–10 carbon atoms, a vinyl group containing radical of 2–10 carbon atoms or a univalent radical obtained by removing hydrogen from an amine group of an aliphatic, alicyclic, heterocyclic or aromatic amine containing at least two primary and/or secondary amine groups, and B is a polymeric backbone comprising carbon-carbon linkages.

Generally the carbon carbon-linkage in (B) comprises at least about 90% by-weight of total polymeric backbone weight, more preferably at least about 95% by-weight of total polymeric backbone weight. The amine-terminated polymers contain an average from about 1.7 to about 3 primary and/or secondary amine groups per molecule of polymer more preferably from about 1.7 to about 2.3 primary an/or secondary amine groups per molecule. The amine-terminated polymers may have Brookfield viscosities (measured using a Brookfield RVT viscometer at 27° C.) from about 500 cps to about 2,500,000 cps more preferably from about 500 cps to about 500,000 cps; the hydroxyl-terminated about 100,000–150,000 cps; the carboxyl-terminated 40,000–265,000 cps; and the vinyl-terminated 85,000–600,000 cps.

The reactive liquid polymers can be prepared as described in U.S. Pat. No. 4,058,657 (such teachings are hereby incorporated by reference). Carboxyl-terminated or ester-terminated liquid polymers having a carbon-carbon backbone are reacted with at least one aliphatic, alicyclic or heterocyclic amine containing at least two primary and/or secondary amine groups. Amine-terminated liquid polymer is also prepared by reacting an acid chloride-terminated liquid polymer having a carbon-carbon backbone with at least one aliphatic, alicyclic, heterocyclic or aromatic amine containing at least two primary and/or secondary amine groups.

The carboxyl-terminated polymers used in manufacturing the amine-terminated materials may contain polymerized units of at least one vinylidene monomer having at least one terminal ethylenically unsaturated group and may be selected from the group consisting of (a) monoolefins containing 2 to 14 carbon atoms, but preferably 2 to 8 carbon atoms such as ethylene, propylene, isobutylene, 1-butene, 1-pentene, 1-hexene, 1-dodecene and the like; (b) dienes containing 4 to 10 carbon atoms more preferably 4–8 carbon atoms such as butadiene, isoprene, 2-isopropyl 1,3 butadiene, chloroprene and the like; (c) vinyl and allyl esters and carboxylic acids containing 2–8 carbon atoms such as vinyl acetate, vinyl propionate, allyl acetate and the like; (d) vinyl and allyl ethers, allyl radicals containing 1–8 carbon atoms such as vinyl methyl ether, allyl methyl ether and the like; and (e) acrylic acids and acrylates such as ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, and B-cyanoethyl acrylate, cyanooctyl acrylate, ethyl methacrylate, methyl methacrylate, and mixtures thereof.

The above-described vinylidene monomers are readily epimerized with 0–50% and more preferably up to about 35% by weight of at least one comonomer selected from the group consisting of (f) vinyl aromatics such as styrene, a-methyl styrene, chlorostyrene, vinyl toluene and the like; (g) vinyl nitrile such as acrylonitrile, methacrylonitrile and the like; (h) vinyl halide such as vinyl bromide, vinyl chloride and the like: (i) divinyls and diacrylates such as divinyl benzene, divinyl ether, diethylene glycol diacrylate, and the like; (j) amides of ethylenically unsaturated carboxylic acids containing 2-8 carbon atoms such as acrylamide and the like; and (k) allyl alcohol and the like.

Examples of preferred liquid carboxyl-terminated polymers include carboxyl-terminated polyethylene, carboxyl-terminated polyisobutylene, carboxyl-terminated polybutadiene, carboxyl-terminated polyisoprene, carboxyl-terminated poly(ethylacrylate) as well as carboxyl-terminated copolymers of butadiene and acrylonitrile and of butadiene and styrene. Carboxyl-terminated co-polymers of butadiene with acrylonitrile or styrene are found to be especially useful. These polymers may contain from 50-100% by weight of butadiene, from about 0-40% by weight of acrylonitrile or styrene and from about 0.4-10% by weight of carboxyl, based upon the total weight of the polymer. Of particular suitability are materials wherein the mole ratio of butadiene/acrylonitrile average about 5/1 and have carbon-carbon chains in the range of 200-300 carbon atoms. Carboxyl-terminated liquid polymers can be prepared by free radical polymerization using carboxyl-containing initiators and/or modifiers as disclosed in U.S. Pat. No. 3,285,949 and by solution polymerization using lithium metal or organo metallic compounds and post treating the polymer to form carboxyl groups as disclosed in U.S. Pat. No. 3,135,716 and 3,431,235. The polymers can also be prepared by reacting liquid polymers having other than terminal carboxyl groups with compounds so as to yield carboxyl groups. For example, they can be prepared from hydroxyl-terminated liquid polymers by reaction with dicarboxyl compounds. The essential features of the polymer are that it have at least terminal carboxyl groups and a polymeric backbone comprising carbon-carbon linkage. The presence of ethylenic unsaturation in the carbon chain appears to produce no significant improved results. Once a carboxyl-terminated polymer has been formed it can be isolated by methods well-known to the art in order to produce acid chloride-terminated liquid polymers. Furthermore, it can be esterified to provide ester-terminated polymers, all of which are reactive with amines to produce the amine-terminated liquid polymer useful in the practice of this invention.

Amines which react well with the carboxyl-terminated, ester-terminated and acetyl-terminated polymers described above include aliphatic amines containing 1-20 carbon atoms, more preferably 1-12 carbon atoms and at least 2, more preferably 2 primary and/or secondary amine groups. Also suitable are alicyclic amines containing 4-20 carbon atoms, most preferably 4-12 carbon atoms and at least 2, more preferably 2 primary and/or secondary amine groups. Heterocyclic amines may also be used which contain from 2-20 carbon atoms, more specifically 2-12 carbon atoms and at least 2, more preferably 2 primary and/or secondary amine groups.

Examples of suitable amines just described include aliphatic amines such as ethylenediamine, 1,2-propanediamine, 1,3-propanediamine, 1,4-butanediamine, 2-methyl-1,2-propanediamine, 1,5-pentanediamine, 1,6-butanediamine, 1,7-heptanediamine, 1,8-octanediamine, 1,10-decanediamine, 1,12-dodecanediamine and the like; aliphatic polyamines such as diethylenetriamine, triethylenetetramine, tetraethylenepentamine, bis(hexamethylene) triamine, 3,3'-iminobispropylamine and the like; alicyclic diamines and polyamines such as 1,2-diaminocyclohexane, 1,8-p-menthanediamine and the like; and heterocyclic diamines and polyamines such as 4-(aminomethyl)-piperidine; piperazine; N-(aminoalkyl)piperazines wherein each alkyl group contains from 1 to 12 carbon atoms, more preferably 1 to 6 carbon atoms, such as N-(2-aminoethyl)piperazine, N-(3-aminopropyl)piperazine, N,N'-bis(3-aminopropyl) piperazine, and the like.

More preferably the amines just described contain at least two primary and/or secondary amine groups having different reactivities makes the amine-termination reaction more likely than the coupling of the liquid polymers, and a smaller amine excess is required in order to avoid coupling. Examples of more preferred amines include some alicyclic amines such as 1,8-p-methanediamine and the like; and some heterocyclic amines such as 4-(aminomethyl)piperidine and N-(aminoalkyl)piperazines wherein the alkyl group contains from 1 to 12 carbon atoms, more preferably 1 to 6 carbon atoms, such as N-(2-aminoethyl)piperazine, N-(3-aminopropyl)-piperazine, and the like. Excellent results were obtained using N-(2-aminoethyl)piperazine.

Aromatic diamines and polyamines can be used to produce amine-terminated polymers. The high temperature required for aromatic amine reaction with carboxyl-terminated polymers causes excessive degradation of reactants and products and is therefore much less preferred. However, aromatic amines react well with the acyl-terminated polymers described heretofore. Suitable aromatic amines contain at least two primary or secondary amine groups bonded directly to at least one aromatic nucleus. Examples of suitable aromatic amines include 4,5-acenaphthenediamine, 3,5-diaminoacridine, 1,4-diaminoanthraquinone, 3,5-diaminobenzoic acid, 2,7-fluorenediamine, 1,5-naphthalenediamine, 1,8-naphthalenediamine, 2,4-toluenediamine, 2,6-toluenediamine, o-phenylenediamine, m-phenylenediamine, p-phenylenediamine and the like.

A solvent is not required for the amine-termination reaction but may be used. Mixtures of solvents may also be used. Suitable solvents include aliphatic and cycloaliphatic ethers containing from 3 to 10 carbon atoms, more preferably from 3 to 6 carbon atoms, such as tetrahydrofuran, diethylether and the like; halogenated aliphatic hydrocarbons containing from 1 to 10 carbon atoms, more preferably from 1 to 6 carbon atoms, such as chloroform, carbon tetrachloride, 1,2-dichloroethylene, trichloroethylene, tetrachloroethylene and the like; and esters containing from 3 to 10 carbon atoms, more preferably from 3 to 6 carbon atoms, such as ethyl acetate, n-butyl acetate, hexyl acetate, benzyl acetate, methyl propionate, ethyl propionate and the like. Also suitable as solvents and more preferred are aromatic compounds having the formula:

minated poly (butadiene/acrylonitrile) having the general formula:

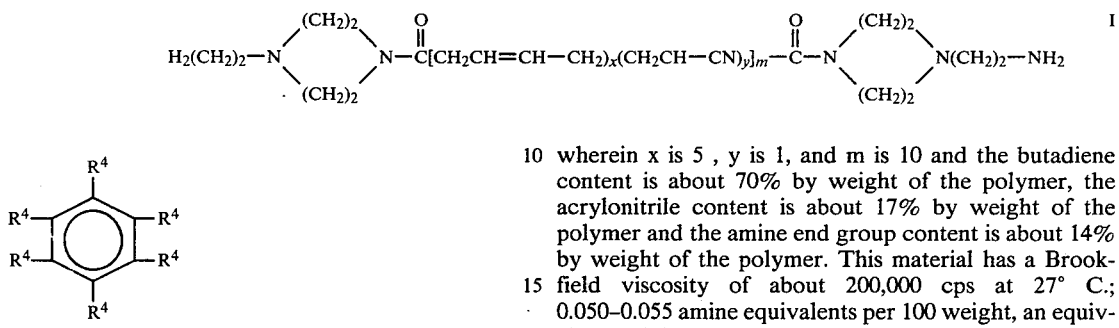

wherein x is 5, y is 1, and m is 10 and the butadiene content is about 70% by weight of the polymer, the acrylonitrile content is about 17% by weight of the polymer and the amine end group content is about 14% by weight of the polymer. This material has a Brookfield viscosity of about 200,000 cps at 27° C.; 0.050–0.055 amine equivalents per 100 weight, an equivalent weight based on 4 amino hydrogens of 840–925; a specific gravity of about 0.938 and a refractive index of 1.5172. This polymer is sold by B.F. Goodrich Company as HYCAR ATBN (1300x16) and can be made by co-polymerizing a mixture of acrylonitrile with butadiene in the presence of a peroxide catalyst in mol ratios of 1/5 thereafter dicarboxylated and reacted with N-(2-aminoethyl)piperazine by a method described above.

Liquid carboxyl-terminated polymers may be prepared by a free-radical polymerization using carboxyl-containing initiators and/or modifiers as disclosed in U.S. Pat. No. 3,285,949 and by solution polymerization using lithium metal or organo metallic compounds and post treating the polymers to form carboxyl groups as disclosed in U.S. Pat. Nos. 3,135,716 and 3,431,235. The polymers can also be prepared by reacting liquid polymers having other terminal functional groups which react with carboxyl-terminated materials. For example, liquid carboxyl-terminated polymers can be prepared from liquid hydroxyl-terminated polymers by reaction with dicarboxyl compounds or anhydrides. Liquid halogen-terminated polymers can be reacted with unsaturated anhydrides in the presence of Lewis acids to yield carboxyl groups. A preferred liquid carboxyl-terminated polymer includes copolymers of butadiene and acrylonitrile. These polymers may contain from 50 to about 100% by weight of butadiene and 40% by weight acrylonitrile. One such liquid polymer is sold under the trademark HYCAR ® CTBN(1300x8) and has a viscosity of 125,000 cps at 27°; a molecular weight in the range of 3,500; 2.37% carboxyl groups; a functionality of 1.85; and an acrylonitrile content of 17% and a specific gravity at 25 C of 0.948. The use of this material is demonstrated in Examples 45 and 46.

Hydroxyl-terminated liquid polymers can be prepared by post reacting carboxyl-terminated polymers, as disclosed in U.S. Pat. Nos. 3,551,471 and 3,551,472; by free-radical polymerization of monomers using hydroxyl containing initiator, as disclosed in U.S. Pat. No. 2,344,632 and by solution polymerization using lithium or organo-metallic catalyst and post reacting the product to form the hydroxyl groups, as disclosed in U.S. Pat. Nos. 3,135,716 and 3,431,235. Preferred hydroxyl-terminated polymers include hydroxyl-terminated copolymers of butadiene and acrylonitrile, such as that sold as HYCAR ®HTBN(1300x17) which is a diester-diol having a functionality slightly less than 2.0, a viscosity averaging 130,000cps at 27° C. and acrylonitrile content averaging 16.5%. The use of such material is demonstrated in Examples 47 and 48.

Vinylidene-terminated liquid polymers can be prepared by reaction of a liquid polymer having at least $$\begin{array}{c} R^4 \\ R^4 - \bigcirc - R^4 \\ R^4 \qquad R^4 \\ R^4 \end{array}$$

wherein $R^4$ is hydrogen, halogen or an alkyl radical containing 1 to 3 carbon atoms, and at least two $R^4$'s are hydrogen. More preferably $R^4$ is hydrogen, chlorine or an alkyl radical containing 1 to 2 carbon atoms, and at least three $R^4$'s are hydrogen. Suitable aromatic solvents include benzene, chlorobenzene, toluene, o-, m-, and p-xylene, o-, m- and p-diethylbenzene, cumene, mesitylene and the like.

A sufficient quantity of at least one amine described heretofore may be reacted with a carboxyl-terminated, ester-terminated or acid-chloride-terminated liquid polymer described heretofore in order to produce an amine-terminated liquid polymer containing from about 1.7 to about 3 primary and/or secondary amine groups per molecule. Typically the average number of total carboxyl, ester or acid chloride groups in a liquid polymer before reaction will be from about 1.7 to about 3 groups per molecule, more preferably from about 1.7 to about 2.3 groups per molecule. In this typical case, from about 1.2 to about 6 mole equivalents and more, more preferably from about 1.2 to about 3 mole equivalents of at least one amine described heretofore can be used per mole equivalent of carboxylated, esterified or acylated liquid polymer described heretofore. However, when the carboxylated, esterified or acrylated liquid polymer also contains polymerized therein appreciable amounts of acrylic acid, acrylates or the like, the amount of amine reacted must be limited so that the amine-terminated liquid polymer contains no more than about 1.7 to about 3 primary and/or secondary amine groups per molecule.

No catalyst is required, and many types of mixing apparatus can be used in the amine termination reaction. For example, simple mixers can be used, including turbine stirrers as well as propeller mixers. Reaction components can be combined in any order. The reaction mixture may be heated (or refluxed if a solvent is used) at a temperature from about 80° C. to about 150° C., typically for about 1 to 6 hours. The amine-terminated liquid polymer may be purified by vacuum distillation or by washing with a solvent such as a benzene-methanol mixture, followed by drying the polymer. Amine content of the amine-terminated liquid polymers can be analyzed qualitatively by infrared spectroscopy. Amine content can also be analyzed quantitatively following the procedure described by Siggia, Quantitative Organic Analysis via Functional Groups, N.Y. Wiley and Sons, Inc. 1963, p. 452–456.

The amine-terminated polymers used in examples 1–44 are prepared readily by following the above-described procedures. For example, a dipiperazino-terterminal functional groups selected from the group consisting of amine, carboxyl, hydroxyl and mercaptan with a compound containing both an oxirane group and a vinylidene group, such as demonstrated in U.S. Pat. No. 4,058,657. A preferred liquid polymer as prepared by reacting glycidylacrylate with dicarboxyl-terminated co-polymers of butadiene and acrylonitrile, such as that sold as HYCAR®BTBNX (1300x23) which has a viscosity of 280,000cps; 3.8% acrylic vinyl; 16.2% acrylonitrile and a specific gravity at 25° C. of 0.973. The use of such material is demonstrated in Examples 49 and 50.

The above-described functional group terminated liquid polymers having about 1.7–3 functional groups per mol are present in a mixture of co-polymerizable polyester and/or polyurethane resins and a co-polymerizable monomer.

Monomers may be selected from styrene, divinyl benzene hexanediol diacrylate, 2-ethylhexyl acrylate, butyl acrylate, and neopentyldiol diacrylate, pentaerythritol triacrylate, glycidylacrylate and their corresponding methacrylate analogs and/or their equivalents.

Co-polymerizable with said vinyl monomers and liquid polymers are vinyl ester urethane resins of the following general formula:

C—I—(D-N)$_t$D—I—C wherein D is a radical derived fron an organic polyol; N is a radical derived from an unsaturated aliphatic dicarboxylic acid or an anhydride thereof; I is a radical derived from a polyisocyanate; C is a carbamyl-linked radical derived from a hydroxy-terminated ester of acrylic or methacrylic acid; t is an integer equal to from 1 to about 5.

These vinyl ester urethane resins are preferably prepared as described in U.S. Pat. No. 3,876,726 and copending application Ser. No. 852,625 pending to Bristowe et al. and by condensing a polyoxyalkylene bisphenol A maleate or fumarate, a polyisocyanate and a hydroxyl-terminated ester of acrylic or methacrylic acid. The teachings of these specifications are hereby incorporated by reference.

Bisphenol A derivatives are condensates of polyoxyalkalene bisphenolA containing 2-20 oxyalkalene units per mol. These materials may be prepared by first reacting a bisphenol A with an alkylene oxide such as ethylene oxide or propylene oxide and thereafter reacting 2 moles of said condensate with 1 mol of an unsaturated aliphatic dicarboxylic acid or anhydride thereof. In addition to bisphenol A, substituted derivatives of bisphenol A type compounds may be utilized having thereon up to two substituents per benzene ring. Especially preferred are derivatives wherein the substitutents are chosen from chlorine, bromine, fluorine and methyl groups in positions ortho to the hydroxyl groups.

The polyoxyalkylene derivatives of bisphenol A are prepared by reacting bisphenol with an alkylene oxide such that the phenolic hydrogens are displaced by polyoxyalkylene chains averaging 1–8 oxyalkalene units per chain. Of particular interest are those compositions having 2–16 oxyalkylene units per mole of bisphenol A. Increased flexibility of the cured coating results as the oxyalkylene chain units are increased.

Unsaturated dicarboxylic acids and anhydrides which are preferred in preparing derivatives useful in the present combination include, for exaample, maleic acid and fumaric acid and their corresponding anhydrides. The amount of unsaturated aliphatic dicarboxylic acid or anhydride employed in the preparation of the polyester portion should be such that the mol ratio of alkoxylated bisphenol A to acid or anhydride is equal to about 2/1 to about 6/5.

Representative polyoxyalkylene bisphenol A polyether derivatives which may be employed include, for example, polyoxypropylene (2) bisphenol A, polyoxyethylene (2.2) bisphenol A, polyoxypropylene (2.2) tetrabromobisphenol A, polyoxypropylene (3) bisphenol A, polyoxypropylene (4) bisphenol A, polyoxypropylene (6) bisphenol A and polyoxypropylene (16) bisphenol A. Corresponding polyoxypropylene and polyoxyethylene derivatives of tetrabromobisphenol A and tetramethylbisphenol A can be included.

In addition to or in place of the polyester polyols described above may be employed aliphatic diols and trols such as ethylene glycol, propylene glycol, butylene glycol, triethylene glycol, neopentyl glycol and 2,2,4-trimethyl-1,3 pentanediol, hexamethylene glycol, trimethylol propane, glycerine, pentaerythritol and the like.

In preparing the polyester urethane resins, the polyisocyanate may be selected from diisocyanates, triisocyanates and isocyanates having up to about 5 isocyanate groups per mol and/or mixtures thereof. Such aliphatic diisocyanates include, for example, methylene-bis(4-cyclohexylisocyanate), isophorone diisocyanate, etc. Aromatic diisocyanates include toluene diisocyanate, diphenylmethane 4,4'-diisocyanate, p-phenylene diisocyanate, dichlor diphenyl methane diisocyanate, dimethyl diphenyl methane diisocyanate, dibenzyl diisocyanate, diphenyl ether diisocyanate, and the like. For example, diisocyanates of the formual:

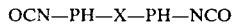

OCN—PH—X—PH—NCO wherein PH is an aromatic ring and wherein X may be a valence bond or an alkylene radical containing 1 to 5 carbon atoms, or where X is oxygen, sulfur, sulfoxide or sulfone are useful.

Polyfunctional isocyanates having an average isocyanate functionality of more than 2, such as polymethylene polyphenylene polysiocyanates are sold under the trademarks of RUBINATE M Polyisoicyanate, and PAPI 901 Polyisocyanate, which have about 2.4–3 isocyanate groups per mol. Mixtures of diisocyanates and polyisocyanates can also be used. When toluene diisocyanate is used it includes a mixture of the 2,4 and 2,6 isomers. The amount of diisocyanate or polyisocyanate employed should be equal to at least 2mols per mol of bisphenol A derivative employed.

The hydroxy-terminated ester of acrylic or methacrylic acids which is used to form vinyl-terminated urethane resins are prepared by reacting acrylic acid or methacrylic acid with an alkylene oxide selected from the group consisting of ethyleneoxide and propyleneoxide. The reaction is carried out by methods that are well known in the art. They are representative of the materials which may be employed including, for example, hydroxypropyl methacrylate, hydroxyethylmethacrylate, hydroxyethyl acrylate, hydroxypropyl acrylate, polyoxyethylene(2) acrylate, polyoxyethylene(2) methacrylate, polyoxyethylene(3) acrylate, polyoxyethylene(3) methacrylate, polyoxypropylene(2) acrylate, polyoxypropylene(2) methacrylate, polyoxypropylene(3) acrylate and polyoxypropylene(3) methacrylate.

The amount of acrylate or methacrylate employed should be equal to at least one mol per mol of unreacted isocyanate group on said above-described urethane ester. Preferred polyester urethane resins are made according to the following examples:

EXAMPLE A

Polyester/Urethane Resin

Into a two liter reaction flask equipped with a stirrer, therometer, nitrogen inlet tube and distillation head there is added 4 moles of polyoxypropylene bisphenol A containing an average of 2.2 mols of propylene oxide per mol of bisphenol A and 2 moles of maleic anhydride. The resulting reaction mixture is heated from 210° to 215° C. and held for 5 hours. A vacuum is applied for 1 hour while maintaining a temperature of from 210°–215° C. 1 mol of this diester is further reacted in the presence of 1.44 grams of hydroquinone, and heated to 80° C. with 2 mols of hydroxypropylmethacrylate and 2 mols of toluene diisocyanate and mixed for a period of 1 hour. The reaction mixture was permitted to rise to a temperature of 135° C. and held at that point for ½ hour. The resultant light colored solid has a melting point of 97° C., an acid number of 7.6, a saponification number of 201, a hydroxyl number of 22, and no residual unreacted isocyanate. The resulting resin is ground to a white finely divided powder and dissolved to form a 50% solids in styrene solution.

EXAMPLE B

Polyester/Urethane Resin

According to the procedure of Example A, 4 mols of polyoxypropylene bisphenol A containing an average of 6 mols of propylene oxide per mol of bisphenol A and 2 mols of maleic anhydride are reacted and thereafter condensed with a mixture containing 2 molar equivalents of toluene diisocyanate and 2 mols of hydroxyethyl acrylate.

EXAMPLE C

Polyester/Urethane Resin

According to the procedure of Example A, polyoxypropylene bisphenol A containing an average of 16 mols of propylene oxide per mol of bisphenol A and maleic anhydride are condensed to form a polyester urethane and thereafter reacted with a mixture containing 2 molar proportions of toluene diisocyanate and hydroxyethyl acrylate per mol of polyester.

EXAMPLE D

Polyester/Urethane Resin

According to procedure as outlined in Example A, a molar portion of polyoxyethylene bisphenol A, having an average of 6 mols of propylene oxide per mol of bisphenol A and a 1 molar equivalent of maleic anhydride are condensed and thereafter reacted with a mixture containing 2 mols of toluene diisocyanate and 2 mols of hydroxypropyl methacrylate.

EXAMPLE E

Polyester/Urethane Resin

A two molar proportion of polyoxypropylene bisphenol A having an average of 6 mols of propylene oxide per mol of bisphenol A is reacted with a molar portion of maleic anhydride as described in Example A. 2.7 mols of this diester maleate is then reacted with a mixture of polyisocyanate having an average functionality of 2.7 isocyanate groups per mol which may be considered as a mixture of 4,4'-diphenylmethane diisocyanates and other polyisocyanates sold under the trademark Rubinate M is reacted in admixture with 2.7 mols hydroxypropyl acrylate until the resin is free of unreacted isocyanate groups.

EXAMPLE F

Polyester/Urethane Resin

According to the procedure as outlined in Example A, a diester prepared by condensing a two molar portion of hexanediol with one molar portion of maleic anhydride is thereafter reacted with a two molar portion of toluene diisocyanate and a two molar portion of hydroxyethyl acrylate. This material is dissolved in styrene to prepare a 70% resin-in-monomer solution.

EXAMPLE G

Polyester/Urethane Resin

According to the procedure as outlined in Example A, a two molar portion of triethylene glycol is condensed with a one molar portion of maleic anhydride and thereafter reacted with a two molar equivalent of toluene diisocyanate and a two molar equivalent of hydroxyethyl acrylate. This materialis dissolved in styrene to form a 70% resin-in-monomer solution.

EXAMPLE H

Polyester/Urethane Resin

According to the procedure as outlined in Example A, a two molar portion of neopentylglycol is condensed with a one molar portion of maleic anhydride and thereafter reacted with a two molar equivalent of toluene diisocyanate and a two molar equivalent of hydroxyethyl acrylate. This material is dissolved in styrene to form a 70% resin-in-monomer solution.

EXAMPLE I

Polyester/Urethane Resin

According to the procedure as outlined in Example A, a two molar portion of 2,2,4-trimethyl-1,3-pentanediol is condensed with a one molar of maleic anhydride and thereafter condensed with a two molar equivalent of toluene diisocyanate and a two molar equivalent of hydroxyethyl acrylate. This material is dissolved in styrene to form a 70% resin-in-monomer solution.

In addition to those described above the polyester/urethane resin can be substituted by polyester resin, such as those having terminal vinyl groups and which are condensation products of unsaturated monocarboxylic acids with a polyepoxide resin having more than one epoxide group per molecule. Representative of this group of resins are the condensation products formed by reacting methacrylic or acrylic acid with a diglycidyl ether of bisphenol A or condensations of this epoxide with hydroxy containing compounds having 5–15 carbon atoms and a 2-hydroxyethyl acrylate, cellosolve acrylate, hydroxybutyl acrylate, hydroxypropyl acrylate or their methacrylate equivalents and similar compounds as provided for in U.S. Pat. Nos. 3,720,592; 3,373,075; 3,306,954; and 3,342,896. Such materials are made commercially available by Dow Chemical Company as Derakane resins. Of particular interest is a styrene solution containing 65% Derakane 470–36 which is the major ingredient in Examples 29, 30 and 31.

Certain ethylenically unsaturated polyester condensation products, such as that prepared by condensing two molar equivalents of maleic anhydride with one molar equivalent of terephthalic acid and three molar equivalents of propylene glycol.

The coating compositions of the invention are homogeneous mixtures of the above-described components. Suitable coatings containing 20-50% by weight of the vinyl ester urethane or vinyl-terminated hydroxy ether polyester component; 2-15% by weight of the functional group terminated liquid co-polymer and 30-60% by weight of vinyl monomer have been produced. In addition to these components, the blend may contain anti-oxidants, mold release agents, adhesion promoters, pigments, fillers, dispersing agents, and catalysts.

A translucent coating is made by blending the liquid amine-terminated polymers, the vinyl ester urethane components, along with monomers, anti-oxidant, mold release agent, and free radical type initiator catalyst. Translucent compositions are listed as parts by weight of the blend in Table I, while pigmented coatings are described in Tables II, III, and IV.

These coating compositions are cured in contact with fully cured sheet compositions as shown in the following examples:

EXAMPLE J

Polyester Sheet Molding Resin

Into a 12"×12" flat mold is placed a gelled pancake made according to a process of U.S. Pat. No. 4,062,826 and 4,073,828 containing 65% fiberglass and 35% of a polyurethane thickened resin composition containing 90 parts by weight of a 40% styrene solution of preformed polyester resin comprising isophthalic acid, maleic acid and propylene glycol; 4.5% by weight of a polyol mixture containing 9 parts polyoxyethylene bisphenol A, having an average of 2 ethylene oxide units and 1 parts by weight of a polyoxypropylenated bisphenol A containing 2 mols of propyleneoxide per mol of bisphenol A; 0.2 parts of a styrene solution containing 10% parabenzoquinone; 1 part by weight of dibutyltin dilaurate; 1 part by weight triethylamine; 3 parts by weight zinc stearate; 1 part of a peroxy ketal catalyst, such as (1,1-di-(t butyl peroxy) cyclohexane or 1,1-di-(t butyl peroxy) 3,3,5 trimethyl cyclohexane in 75% phthalate plasticizer) and 5.5 parts of Rubinate®M, a commercially available 4,4'diphenylmethane polydiisocyanate having an average of 2.7 isocyanate groups per mol is molded into a sheet having a thickness of ¼" at a temperature of 135°–150° C. under a pressure of 400psi. After 2 minutes the mold is opened and 5-10 grams of peroxide catalyzed coating compositions as described in Tables I and II are added from a syringe or automatically. The mold is closed under 400 pounds of pressure and after two minutes the coating cured over the SMC part molded and then taken from the mold.

After 24 hours the cured coatings are tested for adhesion to the cured substrate according to a procedure outlined in the American Society for Testing Materials Test ASTM D-3359-74 otherwise referred to as the crosscut tape test. Adhesion is rated from 0–5, 5 indicating the best adhesion. The rating for each composition is listed sh Tables I, II, III, and IV below.

EXAMPLE K

Polyester Sheet Molding Resin

A gelled sheet molding composition is made by blending 30% fiberglass and 70% of a resin composition having 60 parts of a polyester resin described in Example J; 6 parts styrene; 11.24 parts of the polyol mix described in Example J; 24.28 parts prepolymer prepared by reacting 1 mol of Rucoflex S-1011-110 with 2 mol of toluene diisocyanate and having terminal isocyanate groups; 0.2 parts 10% parabenzoquinone; 0.6 parts triethylamine; 1.0 part of a 75% solution of the ketal catalyst, described in Example J; 3 parts of zinc searate; 150 parts calcium carbonate; and 4.48 Rubinate®M polyisocyanate having a functionality of 2.7 isocyanate groups per mol.

EXAMPLE L

Polyester Sheet Molding Resin

A sheet molding compound containing 30% fiberglass and gelled resin having 16.8 parts of a commercially available ethylenically unsaturated polyester PARAPLEX® P340 (polymethylmethylmethacrylate having carboxyl groups in styrene); 0.56 zinc stearate; 0.7 magnesium hydroxide; 0.28 parts t-butylperoctoate catalyst; and 42 parts calcium carbonate.

This substrate was coated and tested as described in Example J, the results of which are listed in Tables I, II, III, and IV.

EXAMPLE M

Sheet Molding Composition

A sheet molding composition is made by blending polyester containing 30% glass and 70% gelled resin containing 92 parts polyester resin as described in Example J; 4 parts polyol mix as described in Example J; 1 part styrene; 0.02 parts 10% solution parabenzoquinone; 0.1 part polyoxyethylene diamine condensate containing 3 mols of polypropylene oxide and 1 mol ethylene oxide sold under the trademark RA-800 by Union Carbide Chemical Corporation; 0.1 part dibutyltine dilaurate catalyst; 1.0 part peroxide catalyst described in Example J; 4 parts zinc stearate; 140 parts aluminum trihydrate (Alcoa Aluminum Co. C-331) and 4.4 parts Rubinate® M polyisocyanate.

The above compositions were tested as described in Examples J and L, the results of which are listed in Tables I, II, III, and IV as Examples 1–50.

In addition to the polymerizing components, the coating composition may contain a commonly used mold release agent in order to insure the formation of a smooth surface. Metallic soaps such as zinc stearate and other agents such as the natural product Lecithin and duPont's Zelec® UN aliphatic phosphate have performed satisfactorily. Various other common additives which are normally incorporated with the coating composition such as extenders, flexibilizers and colloidal silica may be used in accordance with standard molding practice. Colored pigments, when added to the coating composition, make it possible to fill sink marks and other defects to provide a glossy, pigmented surface all in one operation, so that when the part is removed from the mold it is ready for use without any additional operations such as hand sanding, finishing and conventional finish conating. Such colored primer coats are usually made by incorporating carbon black, clay, iron oxide, lithopone, mica, silicious materials, titanium dioxide and colored pigments.

The reaction between the ethylenically unsaturated vinyl ester urethane and the vinylidene monomer is usually activated by the presence of a catalyst, for example, a perioxide like benzoyl peroxide, cyclohexanone peroxide, ditertiary butyl peroxide, dicumyl peroxide, and tertiary-butyl perbenzoate. Some of these catalysts react at low temperatures to initiate free radicals, while others are activated at higher temperatures, and others by an accelerator such as a dilute solution of cobalt soap or an amine. The selection of the free radical initiator catalysts is important if one is to control the temperature at which the vinylidene monomer polymerization takes place. Inhibitors are sometimes used to prevent premature action by the catalyst. In the performance of the present invention, it is preferred that the polyvinylidene polymerization takes place within the mold at the temperature of the mold.

The compositions of the invention may also be used as spray type primer when certain circumstances are required to repair a fender part which has been damaged to the point where a smooth surface must be generated outside the mold. In such instances, the spray composition may contain a light activated free radical initiating catalyst to cure the coating composition.

In addition to the reactive polymerizing materials may be added a minor portion (2–10% by weight) of an anti-swelling agent selected from the groups consisting of epoxide resins having reactive ethoxide groups which include, for example, Cardura ® E available from Shell Chemical Company, which is a glycidyl ester produced by reacting epichlorohydrin and a mixture of saturated highly branched mainly tertiary monocarboxylic acids having 9–11 carbon atoms; Genepoxy ® N 205, which is a modified diglycidyl ether of bisphenol A, available from General Mills, Inc.; Epon ® 812, which is diglycidyl ether of glycerol, available from Shell Chemical Company; Epon ® 826, which is substantially pure diglycidyl ether of bisphenol A, and Epon ® 828, which is a slightly resinified form of Epon ® 826, available from Shell Chemical Company. Such other materials as glycidyl acrylate and glycidyl methacrylate are also useful. Such epoxide containing materials are useful in concentrations ranging from about 2 to 15% by weight of the coating composition and are thought to deactivate reactive amine cites which are available in the amine-terminated liquid polymers. The use of these anti-swelling agents is demonstrated in Example 25–28, as shown in Table II.

TABLE I

| Example No. | TRANSLUCENT COATING COMPOSITIONS | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Coating Compositions Ingredients (Parts by weight) | | | | | | | | | | | | | | | |
| Example A | 30 | | | | | | | | | | | | | | |
| B | | 30 | | 30 | | | | | 30 | 30 | 30 | 30 | 30 | 30 | 30 |
| C | | | 30 | | | | 30 | 30 | | | | | | | |
| D | | | | | | 30 | | | | | | | | | |
| E | | | | | 30 | | | | | | | | | | |
| HYCAR ®-ATBN-1300X16) | 20 | 20 | 20 | 10 | 10 | 20 | 10 | 10 | 10 | 10 | 10 | 10 | 10 | 10 | |
| HYCAR ®-ATB | | | | | | | | | | | | | | | 10 |
| 1,6 Hexanediol diacrylate | 20 | 20 | 20 | | | | | | | | | | | | |
| 2 Ethylhexyl acrylate | 20 | 20 | 20 | 10 | 10 | 10 | 10 | | 10 | 10 | 10 | 10 | 10 | 10 | 10 |
| Styrene | 10 | 10 | 10 | 50 | 50 | 40 | 50 | 60 | 40 | 20 | | 20 | 40 | 50 | 50 |
| Butyl methacrylate | | | | | | | | | | | 50 | | | | |
| Pentaerythritol triacrylate | | | | | | | | | | | | 10 | | | |
| Hydroquinone(10% acetone soln.) | 0.35 | 0.35 | 0.35 | 0.35 | 0.35 | 0.35 | 0.35 | 0.35 | 0.35 | 0.35 | 0.35 | 0.35 | 0.35 | 0.35 | 0.35 |
| Zinc Stearate | 3 | 3 | 3 | 1 | 1 | 1 | 1 | 1 | 1 | 1 | 1 | 1 | 1 | 1 | 1 |
| 75% Peroxyketal-USP-400P ® (1) | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Tertiary butyl perbenzoate | | | | | | | | | | | | | 1.0 | | |
| Tert-butyl peroctoate | | | | | | | | | | | | | 1.0 | | |
| Substrate Coated | | | | | | | | | | | | | | | |
| Example J | X | X | X | X | | X | X | X | | | X | X | | | |
| K | | | | | X | | | | | X | | | X | X | |
| L | | | | | | | | | X | | | | | | |
| M | | | | | | | | | | | | | | | X |
| Test Results | | | | | | | | | | | | | | | |
| ASTM Test #D 3359-74 | 2 | 5 | 5 | 5 | 1 | 4–5 | 2 | 5 | 5 | 5 | 5 | 2 | 5 | 5 | 5 |

(1) 1,1-di-(t-butyl peroxy)cyclohexane in 75% phthlate plasticizer.

TABLE II

| Example No. | PIGMENTED COATING COMPOSITIONS | | | | | | | | | | | | |
|---|---|---|---|---|---|---|---|---|---|---|---|---|---|
| | 16 | 17 | 18 | 19 | 20 | 21 | 22 | 23 | 24 | 25 | 26 | 27 | 28 |
| Coating Compositions Ingredients (Parts by weight) | | | | | | | | | | | | | |
| Example B | 30 | 30 | 30 | | | 30 | 30 | 30 | 30 | | 30 | 30 | 30 |
| C | | | | 30 | 30 | | | | | 30 | | | |
| HYCAR ®-ATBN(1300-16) | 10 | 10 | 10 | 5 | 5 | 10 | 10 | 5 | 10 | 10 | 10 | 10 | 10 |
| 2 Ethylhexyl acrylate | 10 | 10 | 10 | | | 10 | 5 | 10 | 10 | | | | |
| Styrene | 50 | 20 | 25 | 25 | 38 | 25 | 30 | 30 | 24 | 50 | 50 | 50 | 50 |
| Hydroquinone(10% acetone soln) | 0.35 | 0.35 | 0.35 | 0.35 | 0.35 | 0.35 | 0.35 | 0.35 | 0.35 | 0.35 | 0.35 | 0.35 | 0.35 |
| Lecithin(10% in styrene) | | 5 | | 5 | 5 | 5 | 5 | 5 | 10 | | | | |
| Epon 828 | | | 5 | | | 5 | 5 | 5 | | | | 2.5 | 5.0 |

TABLE II-continued

PIGMENTED COATING COMPOSITIONS

| Example No. | 16 | 17 | 18 | 19 | 20 | 21 | 22 | 23 | 24 | 25 | 26 | 27 | 28 |
|---|---|---|---|---|---|---|---|---|---|---|---|---|---|
| Glycidyl methacrylate | | | | | | | | | | 10 | | | 10 |
| Zinc Stearate | 1.0 | 1 | 1 | 1 | 1 | 1 | 1 | 1 | 1 | | 1 | 1 | 1 |
| Colloidal Silica | 1.0 | | 1.0 | 1 | 1 | 1 | 1 | 1 | 1 | | | | |
| TiO$_2$ | 8 | 8 | 8 | 8 | 8 | 8 | 8 | 8 | 8 | | | | |
| CaCO$_3$ | 4 | | | | | | | | | | | | |
| Carbon black | 1 | 0.8 | 0.8 | 0.7 | 0.8 | 0.8 | 0.8 | 0.8 | 0.8 | | | | |
| Magnesium silicate | | 4.2 | 4.3 | 4.3 | 4.3 | 4.2 | 4.2 | 4.2 | 4.2 | | | | |
| Peroxyketal(75% soln.) (1) | 1.0 | 1.0 | 2.0 | 1.6 | 2.0 | 2.0 | 2.0 | 2.0 | 2.0 | 1 | 1 | 1 | 1 |
| Viscosity(25° C. - cps) | — | — | 1710 | 1350 | 360 | 1414 | 1318 | 488 | 660 | | | | |
| Substrate Coated | | | | | | | | | | | | | |
| Example K | X | X | | | | | | | | X | X | X | |
| L | | | X | X | X | X | X | X | X | | | | X |
| Molding Temp. °C. | 138 | 138 | 150 | 150 | 150 | 150 | 150 | 150 | 150 | | | | |
| Time (secs.) | 120 | 120 | 70 | 70 | 40 | 70 | 70 | 70 | 70 | | | | |
| Pressure (psi) | 400 | 400 | 400 | 400 | 400 | 400 | 400 | 400 | 400 | | | | |
| Test Results | | | | | | | | | | | | | |
| ASTM D 3359-74 Rating | 5 | 5 | 5 | 5 | 5 | 5 | 5 | 5 | 5 | 4/5 | 4/5 | 5 | 5 |

(1) 1,1-di-(t-butyl peroxy)cyclohexane in 75% phthlate plasticizer.

TABLE III

PIGMENTED COATING COMPOSITIONS

| Example No. | 29 | 30 | 31 | 32 | 33 | 34 | 35 | 36 | 37 | 38 | 39 | 40 | 41 | 42 |
|---|---|---|---|---|---|---|---|---|---|---|---|---|---|---|
| Ingredients | (Composition parts by weight) | | | | | | | | | | | | | |
| DERAKANE ®470-36(35% Styrene) | 46.87 | 46.87 | 46.87 | | | | | | | | | | | |
| TA-Resin #7-(40% Styrene) | | | | 50.0 | 50.0 | 50.0 | | | | | | | | |
| Example: F | | | | | | | 42.86 | 42.86 | | | | | | |
| G | | | | | | | | | 42.86 | 42.86 | | | | |
| H | | | | | | | | | | | 42.86 | 42.86 | | |
| I | | | | | | | | | | | | | 42.86 | 42.86 |
| HYCAR ® ATBN(1300x16) | 8.0 | 12.0 | 15.0 | 8.0 | 12.0 | 15.0 | 12.0 | 15.0 | 12.0 | 15.0 | 12.0 | 15.0 | 12.0 | 15.0 |
| Styrene | 22.22 | 22.22 | 22.22 | 18.75 | 25.02 | 32.28 | 15.0 | 15.0 | 15.0 | 15.0 | 15.0 | 15.0 | 15.0 | 15.0 |
| Lecithin (100%) | 0.5 | — | — | — | — | — | — | — | — | — | — | — | — | — |
| Lecithin (90% Styrene) | — | 5.0 | 5.0 | 5.0 | 5.0 | 5.0 | 5.0 | 5.0 | 5.0 | 5.0 | 5.0 | 5.0 | 5.0 | 5.0 |
| Zinc Stearate | 3.0 | 3.0 | 3.0 | 3.0 | 3.0 | 3.0 | 3.0 | 3.0 | 3.0 | 3.0 | 3.0 | 3.0 | 3.0 | 3.0 |
| All Compositions include: | 4.2 NYTAL ® 300 - Magnesium Silicate<br>0.8 STERLING R ® Carbon Black - G.L. Cabot Corp.<br>8.0 T$_1$O$_2$<br>1.0 CABOSIL ® M5-Colloidal Silica - G.L. Cabot Corp.<br>0.35 Hydroquinone (90% Acetone Sol.)<br>2% (based on total weight) 1,1-di(t-butylperoxycyclohexane in 75% phthalate plasticizer)-USP 400P ® Witco Co. | | | | | | | | | | | | | | |
| Substrate Coated Example L | | | | | | | | | | | | | | |
| ASTM Test Results AD-3359-74B | | | | | | | | | | | | | | |
| Panel A at 20 seconds; 600psi; 150° C. | 5 | 5 | 5 | 2 | 4 | 4 | 5 | 5 | 5 | 5 | 5 | 5 | 5 | 5 |
| Panel B at 60 seconds; 600psi; 150° C. | 4 | 5 | 5 | 4 | 4 | 4 | 5 | 5 | 5 | 5 | 5 | 5 | 4 | 5 |

TABLE IV

PIGMENTED COATING COMPOSITIONS

| Example No. | 43 | 44 | 45 | 46 | 47 | 48 | 49 | 50 |
|---|---|---|---|---|---|---|---|---|
| Ingredients | (Composition parts by weight) | | | | | | | |
| Example (B) (30% Styrene) | 42.86 | 42.86 | 42.86 | 42.86 | 42.86 | 42.86 | 42.86 | 42.86 |
| HYCAR ® ATBN (1300x16) | 12.0 | 4.0 | | | | | | |
| HYCAR ® CTBN (1300x8) | | | 12.0 | 4.0 | | | | |
| HYCAR ® HTBN (1300x17) | | | | | 12.0 | 4.0 | | |
| HYCAR ® VTBN (1300x23) | | | | | | | 12.0 | 4.0 |
| Styrene | 12.5 | 12.5 | 12.5 | 12.5 | 12.5 | 12.5 | 12.5 | 12.5 |
| Lecithin(90% Styrene) | 5.0 | 5.0 | 5.0 | 5.0 | 5.0 | 5.0 | 5.0 | 5.0 |
| Zinc Stearate | 3.0 | 3.0 | 3.0 | 3.0 | 3.0 | 3.0 | 3.0 | 3.0 |
| All Compositions include | 4.2 NYTAL ® 300 - Magnesium Silicate<br>0.8 STERLING R ®- Carbon Black - G.L. Cabot Corp.<br>8.0 T$_1$O$_2$<br>1.0 CABOSIL ® M5- Colloidal Silica - G.L. Cabot Corp.<br>0.35 Hydroquinone (90% acetone sol.)<br>2% (based on total weight) 1,1-di(t-butylperoxycyclohexane in 75% phthalate plasticizer)-USP 400P ® Witco Chemc.Co. | | | | | | | |
| Substrate coated Example L | | | | | | | | |
| ASTM Test Results | | | | | | | | |

TABLE IV-continued

| | PIGMENTED COATING COMPOSITIONS | | | | | | | |
|---|---|---|---|---|---|---|---|---|
| Example No. | 43 | 44 | 45 | 46 | 47 | 48 | 49 | 50 |
| AD-3359-74B | | | | | | | | |
| Panel A | | | | | | | | |
| at 20 seconds; 600psi; 150° C. | 5 | 5 | 4 | 4 | 5 | 4 | 4 | 5 |
| Panel B | | | | | | | | |
| at 60 seconds; 600psi; 150° C. | 5 | 5 | 5 | 4 | 5 | 5 | 5 | 5 |

What is claimed is:

1. A coating composition comprising:
2-15% by weight of an amine-terminated liquid polymer containing an average from about 1.7 to about 3 amine groups per molecule, said groups being primary, secondary or a mixture thereof, and said polymer having the formula:

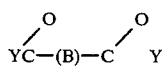

wherein Y is selected from a univalent radical obtained by removing hydrogen from an amine group of an aliphatic, alicyclic, aromatic or a heterocyclic amine containing from 2-20 carbon atoms and at least two amine groups, at least two of said amine groups being primary, secondary or mixtures of primary and secondary amines, and B is a polymeric backbone comprising carbon-carbon linkages, and 20-50% by weight of a vinyl ester urethane resin having the following general formula: C—I—(D—N)$_t$D—I—C, wherein C is a carbamyl-linked radical derived from a hydroxy-terminated ester of acrylic or methacrylic acid, D is a radical derived from polyalkoxylated bisphenol A type compounds, I is a radical derived from a polyisocyanate, N is a radical derived from an unsaturated aliphatic dicarboxylic acid or an anhydride thereof, and t is an integer equal to 1-5; and 30-60% by weight of co-polymerizable ethylenically unsaturated monomers.

2. A composition of claim 1 wherein said carbon-carbon linkages comprise at least 90% by weight of total polymeric backbone weight comprising a polymer of a vinylidene monomer selected from the group consisting of dienes containing 4-8 carbon atoms and vinyl nitriles having the formula $CH_2CR^3CN$, wherein $R^3$ is hydrogen or an alkyl radical containing 1 to 3 carbon atoms.

3. A composition of claim 1, or 2 wherein said amine is N-(aminoalkyl)piperazine, and the aminoalkyl group contains from 1-12 carbon atoms, and said polymer is a co-polymer of a vinylidene monomer is at least 1 diene, and 1 vinyl nitrile.

4. A composition of claim 3 wherein said amine is N-(2-aminoethyl)piperazine, and said diene is butadiene and said vinyl nitrile is acrylonitrile.

5. A composition of claim 1 wherein said vinyl ester urethane resin is a condensate of polyoxyalkalene bisphenol A having 2-16 mols of ethylene oxide or propylene oxide per mol, N is derived from maleic anhydride or maleic acid, I is a radical derived from the group selected of toluene diisocyanate or a polyisocyanate having 2.4-3 isocyanate groups per mol.

6. A composition of claim 1 wherein said co-polymerizable ethlenically unsaturated monomers are selected from the group consisting of styrene, ethyl acrylate, propyl acrylate, isopropyl acrylate, hexanediol diacrylate, 2 ethylhexyl acrylate, 2 ethylhexyl methacrylate, butyl acrylate, butyl methacrylate, neopentyldiol diacrylate, neopentyldiol dimethacrylate, pentaerythritol triacrylate, and pentaerythritol trimethacrylate.

7. A composition of claim 1 which includes 2-10% by weight of an anti-swelling agent having reactive epoxide groups.

8. A composition of any one of claims 1-7 having a free radical initiator catalyst.

9. A cured composition of claim 8 caused by the activation of said catalyst.

10. A molded thermoset plastic article having a compression or injection molded coating comprising a cured composition of any one of claims 1-8.

11. A cured reinforced molded resin selected from the group of polyester, polyurethane, polyisocyanurate, polyethoxy and polycarbonate resins having a smooth surface coating of a cured composition of any one of claims 1-8.

12. A composition of claims 10 or 11 wherein said surface coating has a thickness of 0.5-5 mils.

* * * * *

UNITED STATES PATENT AND TRADEMARK OFFICE
CERTIFICATE OF CORRECTION

PATENT NO. : 4,242,415
DATED : December 30, 1980
INVENTOR(S) : Joseph Feltzin, et al.

It is certified that error appears in the above-identified patent and that said Letters Patent are hereby corrected as shown below:

Column 8, line 17, delete "polyester" and insert therefor --polyether--.

Column 8, line 36, delete "formual" and insert therefor --formula--.

Column 11, line 27, insert the word "molding" after the word "sheet".

Column 11, line 68, delete the word "sh" and insert therefor --in--.

Column 12, line 13, delete "searate" and insert therefor --stearate--.

Column 12, line 24, delete "(polymethylmethylmethacrylate" and insert therefor --(polymethylmethacrylate--.

Column 12, line 67, delete "conating" and insert therefor --coating--.

Column 13, line 4, delete "monome" and insert therefor --monomer--.

Signed and Sealed this

Fourteenth Day of April 1981

[SEAL]

Attest:

RENE D. TEGTMEYER

Attesting Officer    Acting Commissioner of Patents and Trademarks